United States Patent
Staiger

(10) Patent No.: US 7,133,949 B2
(45) Date of Patent: Nov. 7, 2006

(54) DISTRIBUTED SWITCHING METHOD AND APPARATUS

(75) Inventor: Dieter Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 10/947,705

(22) Filed: Sep. 23, 2004

(65) Prior Publication Data
US 2005/0080977 A1 Apr. 14, 2005

(30) Foreign Application Priority Data
Sep. 29, 2003 (EP) ................... 03103604

(51) Int. Cl.
*G06F 13/368* (2006.01)
(52) U.S. Cl. .................. 710/119; 710/36; 710/242; 326/35
(58) Field of Classification Search ................ 710/119, 710/242, 36; 714/797; 326/35
See application file for complete search history.

(56) References Cited

U.S. PATENT DOCUMENTS

| | | | | |
|---|---|---|---|---|
| 4,135,240 A | * | 1/1979 | Ritchie | 711/164 |
| 4,271,465 A | * | 6/1981 | Ohtsuka et al. | 710/119 |
| 5,463,741 A | * | 10/1995 | Levenstein | 710/119 |
| 5,519,838 A | * | 5/1996 | Ziegler et al. | 710/119 |
| 5,774,731 A | * | 6/1998 | Higuchi et al. | 710/200 |
| 6,389,497 B1 | * | 5/2002 | Koslawsky et al. | 710/242 |
| 6,609,185 B1 | * | 8/2003 | Walton | 711/167 |
| 6,877,052 B1 | * | 4/2005 | Osborne | 710/107 |
| 6,941,483 B1 | * | 9/2005 | Brown et al. | 713/500 |

* cited by examiner

*Primary Examiner*—Mark H. Rinehart
*Assistant Examiner*—Matthew Spittle
(74) *Attorney, Agent, or Firm*—David R. Irvin

(57) ABSTRACT

Switching method and apparatus for assigning a communication grant to a first processing unit in a communication network comprising a plurality of processing units, each processing unit being connected to each other processing unit of the plurality of processing units. The switching method includes steps of performing an identical arbitration procedure for a communication grant by each of the plurality of processing units, and switching at least one of the plurality of processing units according to the identical arbitration procedure.

3 Claims, 5 Drawing Sheets

DISTRIBUTED SWITCHING METHOD AND APPARATUS

FIELD OF THE INVENTION

The present invention relates to the field of embedded multi-processor systems comprising several processing units in the framework of industrial control units such as manufacturing line control units, automotive control units, home appliance electronic control units, and control units for commercial and industrial diagnostic equipment tools.

BACKGROUND

In embedded multi-processor systems, communication or data exchange between several processing units is typically realized by any standard type of network technology based on various bus architectures. The most common bus topologies are denoted as straight bus topology, ring bus topology, or star topology. In the straight bus topology, the communication bus connecting several processing units can be represented as a single line to which each of the processing units is separately connected.

Communication and data exchange between single processing units is provided by the straight bus. Access to the common bus is controlled via bus controller and arbiter modules belonging to each processing unit. Typically, transmission of a message from a processing unit is only possible when the processing unit has a bus grant. The assignment of bus grants to various processing units depends on data transfer requests of the single processing unit as well as a potential message priority or urgency identifier.

A ring topology of a network connecting a plurality of processing units is based on the same technique as the straight bus system. Here, the bus system connecting the several processing units can be represented as a closed ring instead of a straight line. The communication and data transfer between the single processing units is based on the same technique of requesting and assigning a bus grant to a determined processing unit. Networks based on the straight bus and the ring bus topology are widely employed as, for example, Ethernet or token ring networks. They are very easy to realize, and, due to their high volume production, they are very attractive in cost as well.

Nevertheless, the straight bus and the ring bus topology have a common disadvantage, which is that they have a so-called single point of failure. When the straight bus or the ring bus are interrupted for any reason at a single point, the communication between all participants on the network will be disabled. Hence, the data transfer and communication of the entire network will break down. Under conditions such as extreme temperatures or extreme mechanical stress, which may be likely to occur in the automotive or industrial manufacturing environment, the long-term reliability of a straight bus or a ring bus system network cannot be guaranteed.

In a star topology, the single processing units are each connected to a central switch. In principle this topology is less sensitive to system failure. When, for example, a single connection between a processing unit and the central switch is discontinued, the remaining system maintains its functionality. However, in this topology the central switch represents a single point of failure. When the central switch fails, the entire communication of the network breaks down.

In order to circumvent single point failures and their disadvantages, fault tolerant techniques can in principle be implemented, which, unfortunately, increase implementation efforts and costs. Such fault tolerant implementations can be achieved by using massive redundancy and high performance micro processor systems for performing extensive re-routing calculations.

Common network architectures and topologies often have a limited bandwidth, and therefore introduce bottle necks that limit the overall system communication capabilities. Long-term reliability and fault tolerance functions are especially difficult to implement, and substantially increase the total cost of the network.

SUMMARY

The present invention includes methods and apparatus for switching a plurality of processing units connected to a bus system. The general architecture of the invention is similar to the star topology except that the functionality of the central switch is distributed to the participating processing units. Each processing unit is individually connected to each other processing unit of the plurality of processing units.

According to a preferred embodiment of the invention, all processing units are directly connected to each other. The arbitration or switching procedure in order to issue a communication grant to a determined processing unit is performed simultaneously by an identical arbitration procedure in each processing unit separately. A first processing unit that wants to transmit a message to a second processing unit transmits a communication request to all connected processing units. Depending on the load of the network and on the message identifiers, the transfer request of the first processing unit is processed by each processing unit in substantially the same way.

Finally, a common communication grant is issued to the first processing unit by the other processing units. According to the type of communication grant, the appropriate processing unit is switched in order to transmit or receive the message. In contrast to the star topology, the switching module is not centrally located; rather, the switching functionality is distributed among the processing units themselves.

According to another preferred embodiment of the invention, a processing unit sends a message transfer request to all other processing units in order to receive a communication grant. In the same way, all other processing units may also request a communication grant. In an extreme situation, each processing unit may receive a message transfer request from each of the other processing units. In this case, the plurality of message transfer requests are processed separately in the same way by each of the processing units.

As a consequence, all of the processing units will determine the same communication grant to any particular processing unit, because the underlying processing algorithm and the initial conditions given by the plurality of message transfer requests are the same for each processing unit. The resulting communication grant is then issued, and the corresponding processing unit will be switched and therefore establish the required connection.

In this way, no central switching device is required to assign a communication grant to a processing unit. Furthermore, the entire system no longer has a single point of failure. Here, the failure of one or more processing units or interlinks between processing units has only minor consequences on the overall communication of the entire network.

The failure of interlinks can be compensated as long as each processing unit is properly connected to the network by at least one connection. When a processing unit fails, only its distinct functionality is lost; the functionality of the remaining processing units and the message routing and switching functionality of the network is completely maintained.

In accordance with a preferred embodiment of the invention, a communication or communication grant to any particular individual processing unit is generated by a voting procedure performed by all participating processing units. In the same way as described above, the processing units transmit and receive a plurality of message transfer requests. According to the common algorithm and the plurality of received message transfer requests, each processing unit determines communication grants.

When one of the processing units fails, it may determine a communication grant that deviates from the common communication grant determined by all of the other processing units. Therefore, a voting procedure is incorporated between the steps of determination of communication grants and the issuing of the communication grant.

The voting procedure generally has two steps. In the first step, each processing unit sends its determined communication grant as a vote to all other processing units. In the second step, each processing unit separately compares the received votes of all other processing units including its own vote. According to the majority of votes, a common communication grant is then issued. This compensates for the failure of one or more processing units or interlinks between processing units. Thus, fault tolerance is inherent in this system, requiring neither any kind of user interaction nor any software or hardware reconfiguration.

The voting procedure as well as the determination of processing units receiving a communication grant is performed substantially simultaneously by each processing unit. An entire vote, which is represented by a bit sequence, may be sequentially processed by each processing unit. The determination of the vote majority may be performed bit-by-bit simultaneously by each processing unit, i.e., the single bits of the votes, rather than the entire vote, are compared in a time concurrent way. As a result, the vote and vote majority calculations require little computational power, and may therefore be implemented using a rather simple conventional integrated circuit.

Because such a small amount of computational power is required for the voting procedure, the power supply for the voting, arbitrating, and switching procedure to be performed by the processing units may be carried the communication interlinks between the processing units themselves. Therefore, no additional power supply is required for switching or arbitration purposes, which further enhances the system's overall reliability.

In another preferred embodiment of the invention, the common algorithm for the determination of the communication grant by each processing unit takes further into account a message quality specification, a message priority specification, a message urgency specification, a processing unit allocation status, and a vote statement, as well as the message transfer request and the message destination. In this way the method can universally be adapted to a wide variety of message transfer demands.

The message quality specification may include, for example, a required bandwidth, a maximum allowable latency time, or parameters indicating, for example, synchronous, asynchronous, or isochronous data transfer modes. When two messages with different priority specifications request communication access simultaneously, the message with the higher priority specification will receive the communication grant, whereas the message with the lower priority will be delayed or will receive a communication grant to an alternative processing unit. In this way a real-time processing of time-critical messages may be provided.

In accordance with a preferred embodiment of the invention, the messages being transferred between the single processing units of the underlying system have a message control slot and an encapsulated message. The message control slot specifies the message transfer request; the message destination; the message quality, priority, or urgency specification; a processing unit allocation status; and a vote statement. In other words, the message control slots contain the information required by the distributed switching system to process of the message.

In this way, the message control slot specifies a target processing unit to which the message is to be sent, as well as priority and urgency specifications that determine a potential time-critical property of the message. Furthermore, the message control slot also contains information about the allocation status of the sending processing unit as well as a vote statement containing information about the individual votes of the processing units. Thus the message control slot can be interpreted as a message header that contains information about distinct properties of the message as well as information about the processing of the message.

The second part of the message in form of the encapsulated message contains an arbitrary data packet. This encapsulated message may for example represent an alien message belonging to a different communication protocol. The alien message itself may also contain header information as well as a distinct data content. In general there are no limitation for the alien message at all. The single processing units of the distributed switching system may also have an external connection to a distinct sub-network that may run a different communication protocol. Encoding and decoding of encapsulated messages is therefore entirely performed by each processing unit itself depending on the type of sub-network which is connected to such a processing unit.

In accordance with a preferred embodiment of the invention, the messages sent between the processing units of the distributed switching system are all equal in length, and the underlying clocks of the participating processing units are isochronous. In order to provide universality of the entire system, encapsulated messages can be different in length. Since the size of the message control slot and the overall length of the message need to be constant, due to the use of an isochronous clock, inherent variations in the lengths of encapsulated messages may be compensated for by bit stuffing.

In accordance with a preferred embodiment of the invention, the control slot of the message may include a number of consecutive request slots. Each request slot may be assigned to a distinct processing unit, in which case the number of request slots within a message control slot is equal to the number of processing units in the entire distributed switching system. When, for example, a processing unit requests access to the bus, it places an appropriate data transfer request in its assigned message request slot within the message control slot. Then the entire message control slot containing all message request slots is transferred to the other processing units. By way of a distinct message request slot, a corresponding processing unit requesting a communication grant can be identified easily by all other processing units.

In accordance with a preferred embodiment of the invention, the message control slot may also have a so-called vote slot, in which the votes for the common voting procedure of all processing units are placed. Distribution of the votes of each individual processing unit to the other processing units may be performed by means of the message control slot. Like the single message request slots, the vote slot contains the votes of the processing units consecutively. The vote slot is then processed by each processing unit in order to determine the majority vote. According to the majority vote, the communication grant may be issued to that processing unit being represented by the majority of votes. Alternatively, a communication grant-may be issued to a distinct processing unit, when the distinct processing unit has been represented by at least a predetermined minimum number of votes. Due to the each-to-each link topology, several processing units can communicate with each other simultaneously, which increases the overall bandwidth of the network system.

In accordance with a preferred embodiment of the invention, the control slot may also include an autonomic message field for an autonomic learning function. When, for example, the vote of a particular processing unit deviates from the majority of votes, an identifier of the deviant processing unit maybe stored in the autonomic message field. When the vote deviates from the majority because of a malfunction, the identifier of this deviant processing unit may repeatedly be stored in the autonomic message field during subsequent cycles of access request. Once an identifier of a malfunctioning processing unit has been stored in the autonomic message field for a predetermined number of times, depending on the predefined system specification, different actions may be taken, such as regarding the deviant processing unit as out of order by the other processing units. Alternatively, a functionality check may be run for the distinct processing unit, requesting parameters like voltage or temperature of the processing unit in order to identify a potential problem.

Once a particular processing unit has been determined to be out of order, the votes of this processing unit are disregarded by the other processing units, and the out-of-order processing unit will not receive any communication grants in the future. In this way, the distributed switching system automatically detects malfunctioning processing units and initiates steps to isolate the malfunctioning processing units. Thus, autonomous behavior is embedded in the distributed switching system. In other words, the system learns that a particular part is not working correctly, and automatically initiates steps to circumvent the problem.

Further, the system may also replace the functionality of the malfunctioning processing unit. In this way, the long-term reliability of the entire system can be guaranteed. Ideally, the user would not even take notice of an eventual failure of any individual system component.

In some cases it may be advantageous to revise an out-of-order assignment of an individual processing unit. For example, a processing unit that fails because of temporarily extreme external conditions such as increased temperature may operate correctly when the temperate drops again to a moderate value. Therefore, the system preferably submits in a cyclic way a re-verification request to those processing units that have been identified as malfunctioning. When a processing unit responds that it works properly again, its out-of-order assignment will be revised and the processing unit will be re-integrated into the network. The cycles in which such re-verification requests are submitted may be adapted with respect to the system requirements.

According to a preferred embodiment of the invention, the individual processing units are adapted to provide multi-tasking functionality. For example, an exemplary processing unit is capable of sustaining a pair of simultaneous connections involving four other processing units.

In this way the communication bandwidth of the entire distributed switching system is enhanced. Accordingly, the effectiveness of multi-path communication and the overall flexibility of the entire system are increased. Furthermore, a large message that needs to be transferred may be split into several sub-messages that are simultaneously sent via different alternative paths to a target processing unit. For such an implementation, the message control slot should contain information about the single split messages, which may easily be arranged. In this way the overall bandwidth of the switching and communication system can be enhanced by a substantial factor.

In accordance with a preferred embodiment of the invention, a processing unit comprises a request and calculation module, and a vote and execution module, which two modules may be separate entities. The request and calculation module process messages and invokes a data transfer request. The vote and execution module provides message routing and switching. The vote and execution module is connected to the other processing units via external links and the processing of the data transfer requests received from the other processing units as well as the voting procedure.

According to a preferred embodiment of the invention, the vote and execution module comprises a switch array that physically establishes a connection for a communication grant to the processing unit or a connection between internal or external links. Furthermore, the vote and execution module comprises a vote control module that receives and processes the votes of each processing unit in order to determine a common grant.

In accordance with a preferred embodiment of the invention, the vote and execution module comprises a vitality module which is adapted for the identification of malfunctioning processing units. If a vote from a distinct processing unit deviates from the majority of votes of the other processing units several times, the vitality module monitors and processes this information and may initiate further steps in order to replace the switching or the processing functionality of this deviating processing unit.

In accordance with a preferred embodiment of the invention, each processing unit is connected to all other processing units via individual internal connections. Each processing unit may be additionally connected to an external device or sub-network via an external connection. Consequently, the invention may serve as a switching, a routing, or a processing device.

BRIEF DESCRIPTION OF THE DRAWINGS

In the following, preferred embodiments of the invention will be described in greater detail by making reference to the drawings, in which.

DETAILED DESCRIPTION

Figure 1A:
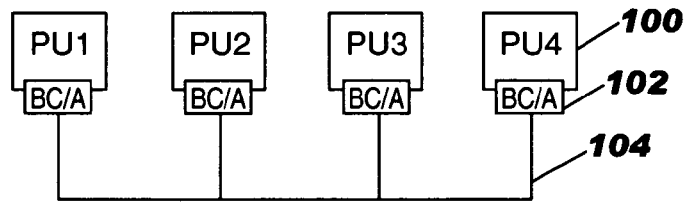
FIG. 1a shows a block diagram of a straight bus network.

FIG. 1a shows four individual processing units 100, each of which is connected to a bus controller and arbiter module 102, each of which is connected to a straight bus 104. Communication or data exchange between the processing units 100 can be established after a communication grant of the bus 104 has been issued to one of the processing units. The communication between the individual processing units 100 and the bus 104 is handled by the bus controllers 102.

Figure 1B:
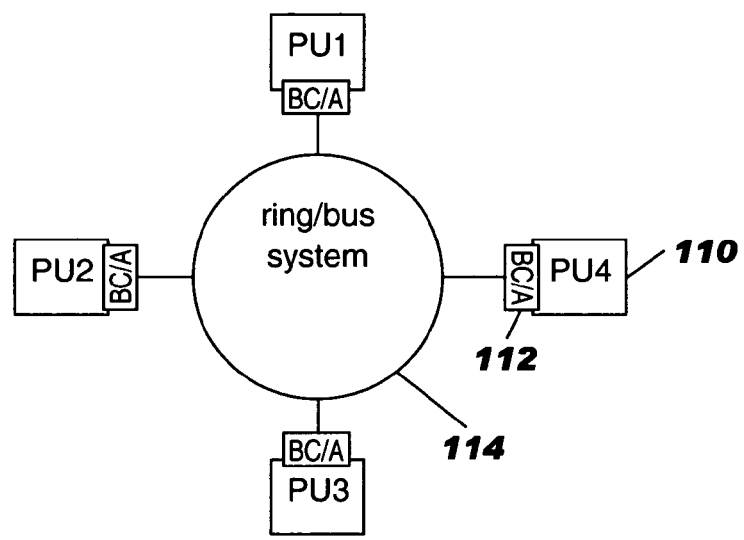
FIG. 1b shows a block diagram of a ring network topology.

FIG. 1b shows a block diagram of a network system based on a ring topology. The ring network 114 is represented by a ring, and connects a plurality of processing units 110. The bus controller and arbiter modules connected to each processing unit provide access to the bus 114 of their corresponding processing unit 100.

Figure 1C:
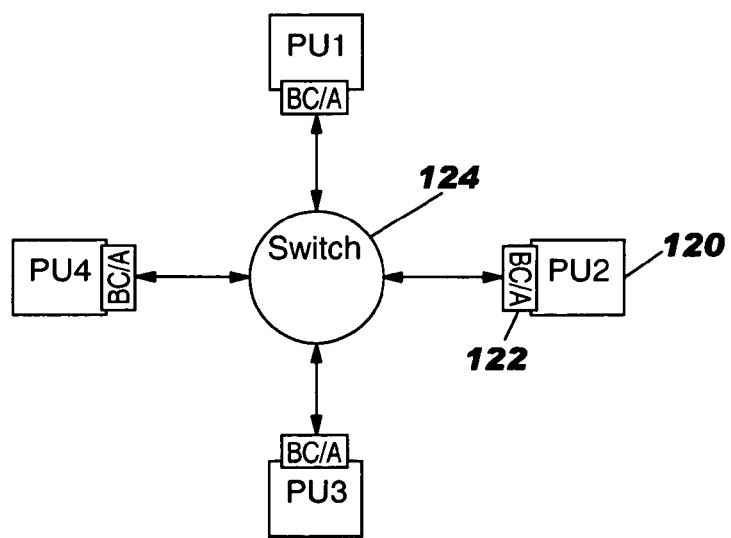
FIG. 1c shows a block diagram of a network according to the star topology featuring a central switch.

FIG. 1c illustrates a bus system based on the star topology. Here, each of the processing units 120 is separately connected to a central switch 124. Each processing unit 120 makes use of a bus controller and arbiter module 122 as an interface to the central switch 124. Depending on its configuration, the switch can either connect processing units to each other by pairs, or it may connect a processing unit to an external device or sub-network connected to the switch 124.

Figure 2:
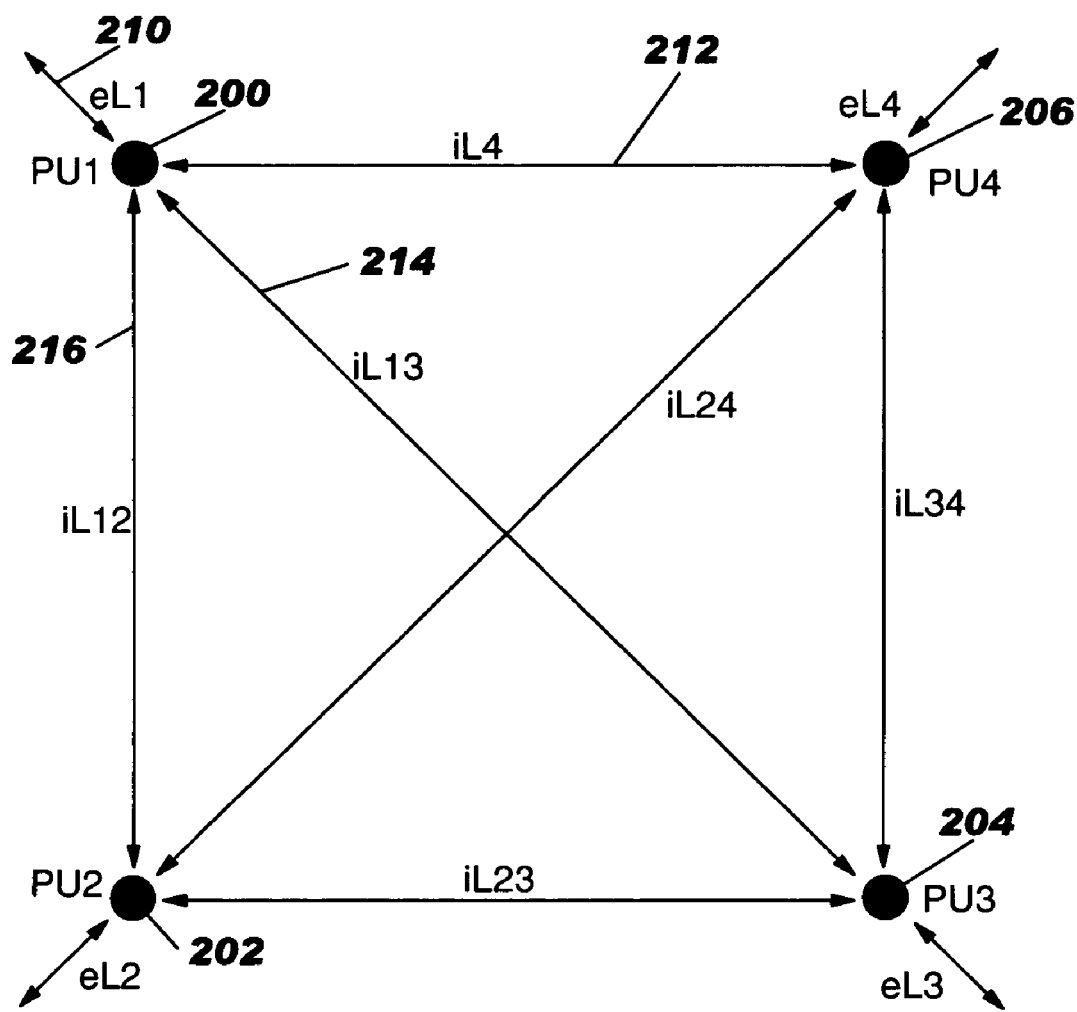
FIG. 2 shows a block diagram of a preferred embodiment of the invention.

FIG. 2 shows a block diagram of a preferred embodiment of the invention. In this embodiment, the distributed switching system comprises four single processing units 200, 202, 204, and 206. The processing units 200, 202, 204, and 206 are connected to each other, and each processing unit 200, 202, 204, and 206 is connected to an external connection. The processing unit 200 is connected to the processing unit 202 via the connection 216, to the processing unit 204 via the connection 214, to the processing unit 206 via the connection 212, and to the external connection 210. Likewise, the processing unit 202 is separately connected to the processing units 200, 204, 206, as well as to an external link. The processing units 204 and 206 are also connected in the same way as the processing units 200 and 202.

Suppose that the processing unit 200 wants to transmit a message to the processing unit 204. In order to receive a communication grant for the transmission of the message, the processing unit 200 places a data transfer request in the appropriate message request slot of a message control slot which is sent to the processing units 202, 204 and 206. The message control slot received by each processing unit 200, 202, 204, and 206 is processed by each processing unit separately. Apart from the data transfer request of processing unit 200, the message control slot may also contain data transfer requests from the other processing units 202, 204, and 206. Since the message control slot typically also contains information about the processing unit allocation status as well as information about the priority or urgency of the single data transfer requests, each processing unit, 200, 202, 204, and 206 determines a processing unit that receives the communication grant.

The determination of the processing unit receiving a communication grant is based on an algorithm which is common to each processing unit. Since every processing unit 200, 202, 204, and 206 receives the same message control slot, the algorithm for the determination of a processing unit receiving communication grant is also based on the same initial conditions. Therefore, each processing unit 200, 202, 204, and 206 should determine the same processing unit receiving a communication grant.

In order to enhance the long-term reliability of the entire switching system, the method further compares the result of the determination process of each processing unit. This comparison is implemented by a voting procedure in which the result of a determination process of each processing unit is consecutively inserted into a vote slot of the message control slot. Before the communication grant is issued, the message control slot and the vote slot are transmitted to every processing unit. The vote slot is processed in a bit-by-bit simultaneously by each processing unit 200, 202, 204, and 206, and a communication grant is issued to that processing unit to which the majority of votes corresponds.

With this voting procedure, the method guarantees that a determination by a malfunctioning processing unit has no effect on the assignment of a communication grant to a processing unit. Moreover, the entire switching system remains intact even when one or more processing units or one or more interlinks are out of order.

Figure 3:
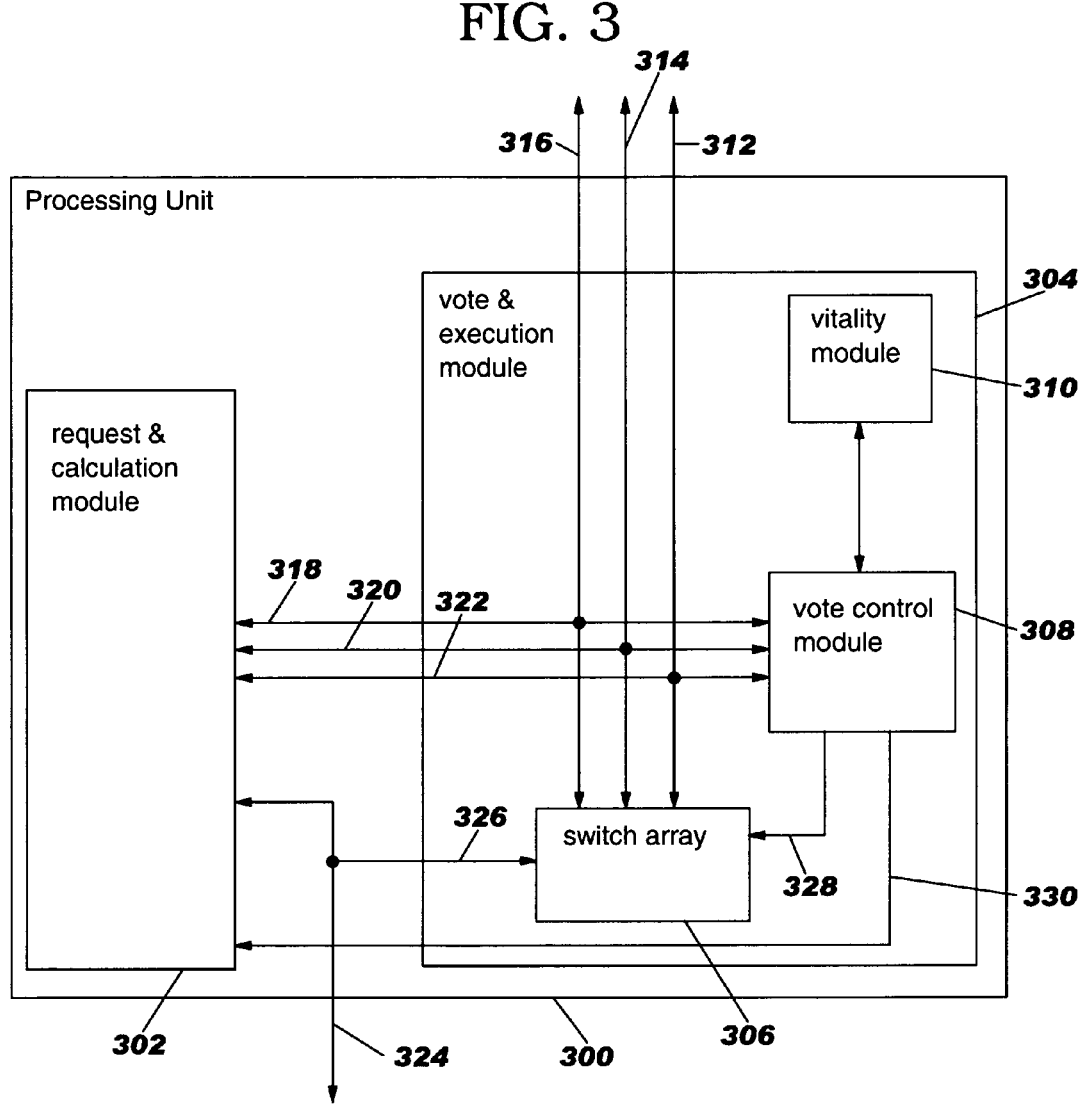
FIG. 3 shows a block diagram of a processing unit of the invention.

FIG. 3 shows a block diagram of a preferred embodiment of the processing unit 300 for the distributed switching system. The processing unit 300 comprises a request and calculation module 302, as well as a vote and execution module 304, which may be separated from the request and calculation module 302. The vote and execution module 304 further comprises a switch array 306, a vote control module 308, and a vitality module 310. The switch array 306 is connected to three internal links 312, 314 and 316 connecting the processing unit 300 to three other processing units.

Three connections, 318, 320, and 322, connect the request and calculation module 302 with the vote control module 308 of the vote and execution module 304. The three connections 318, 320 and 322 cross the three internal connections 312, 314 and 316 in such a way that the connection 318 is also connected to the internal link 316, the connection 320 is also connected to the internal connection 314, and the connection 322 is also connected to the internal connection 312.

The request and calculation module 302 is further connected to an external link 324, which in term is connected to the switch array via a connection 326. The vote control module 308 is further connected to the switch array via a connection 328, and it is connected to the request and calculation module 302 via the connection 330. The vitality module 310 is connected only to the vote control module 308.

In the embodiment shown in FIG. 3, in which the switch array 306 is connected to three internal links 312, 314 and 316, the switch array 306 can be realized by a shift register comprising about ten field effect transistors (FET). The number of FETs and the complexity of the shift register strongly depend on the number of processing units and the number of existing interlinks between these processing units. The number of FETs increases rapidly as a function of the number of processing units. By means of the configuration described in FIG. 3, any combination between two internal links or between an internal and the external link can be realized. Consequently, any arbitrary switching configuration can be represented by a ten-bit-long data sequence. In the present configuration, the vote slot of a message is therefore 40 bits long, and consecutively contains the vote of each processing unit.

The vote control module 308 processes the vote slot of a message containing the vote of each processing unit. After comparing the vote slots, the vote control module 308 transmits a ten-bit data sequence via the connection 328 to the switch array 306. In this way the desired switching configuration is realized. The vote control module 308 transmits the entire vote slot containing 40 bits of information to the request and calculation module 302 via the connection 330.

Figure 4A:
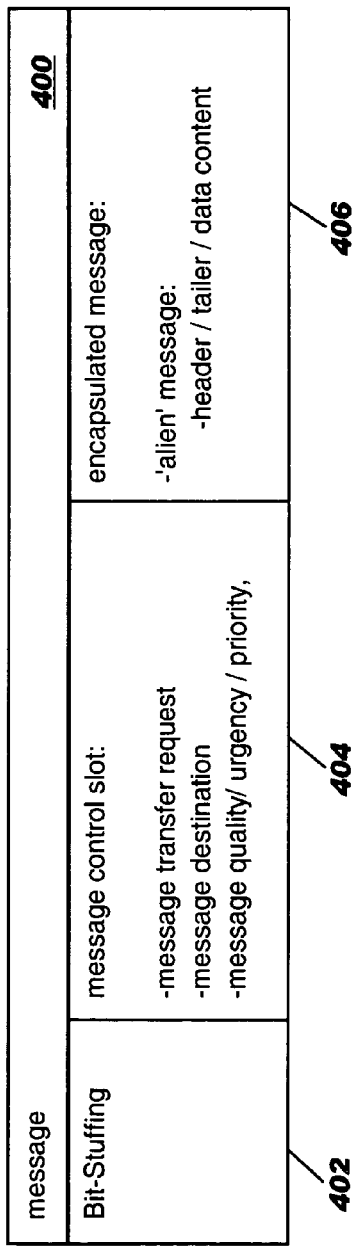
FIG. 4a shows a block diagram of a message for the distributed switching system of the invention.

FIG. 4a shows a block diagram illustrating the structure of a message being transferred between the individual processing units of the invention. The message 400 comprises a bit stuffing segment 402, a message control slot 404, and an encapsulated message 406. The message control slot 404 contains a message transfer request, a message destination, a message quality specification, a message priority specification, a message urgency specification, a processing unit allocation status, and a vote statement.

Using these parameters and specifications, a variety of switching and routing mechanisms can be implemented. The encapsulated message 406 includes an alien message referring to, for example, a different sub-network with a different communication protocol. The alien message may further comprise a header and a trailer, as well as data content. Thus, the switching method of the present invention can universally be adapted to a variety of existing network and communication protocols.

Since the method is based on isochronous clocking, the messages 400 must be equal in length. In order to allow the encapsulated messages 406 to be different in length, the length of the bit stuffing segment 402 can be adapted. The bit stuffing segment 402 does not contain any kind of data or information; rather, it simply fills a potential gap that may arise within the message when encapsulated messages of different length are considered.

Alternatively, the method may also support a circuit switched communication mode, in which a path connecting two or more specific processing units is maintained for a required period of time. In such a case, those interlinks belonging to the path are reserved for the given time period and are not available for any other potential communication request during that period of time.

Figure 4B:
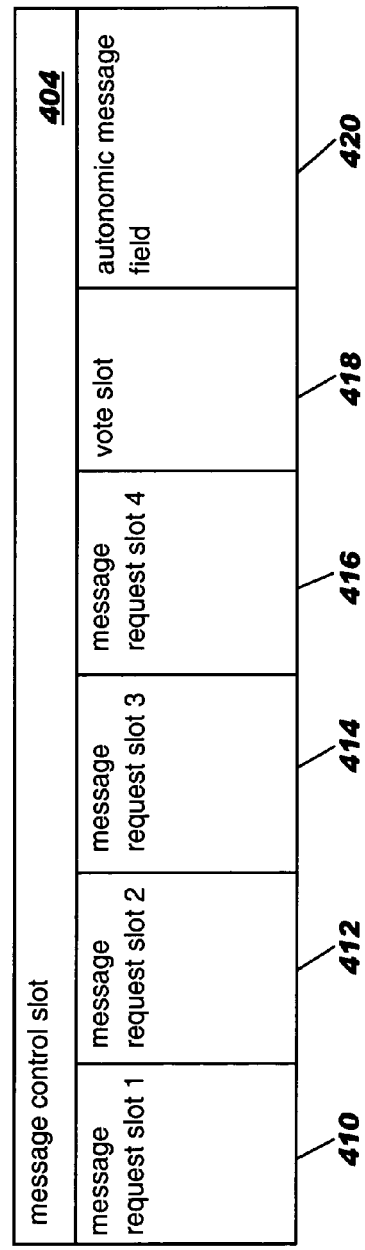
FIG. 4b shows a block diagram of a message control slot.

The message control slot 404 is illustrated in FIG. 4b. The message control slot 404 further comprises four consecutive message request slots 410, 412, 414, and 416. The message control slot 404 contains a vote slot 418 and an autonomic message field 420. In the underlying example, the switching apparatus consists of four different processing units; accordingly, each message control slot comprises four message request slots 410, 412, 414, and 416, such that each processing unit is assigned to a distinct message request slot.

A message transfer request from a processing unit is placed in the corresponding message request slot. The individual votes that are generated by each processing unit in order to perform the voting procedure are placed consecutively into the vote slot 418, which is processed in a time concurrent bit-by-bit way. When the network comprises four processing units and when a single vote is 10 bit long, the entire vote slot contains 40 bits, thereby representing all votes of the participating processing units. Information about malfunctioning processing units that may be gathered from preceding vote procedures is stored in the autonomic message field 420. In this way the message control slot 404 contains information about potentially malfunctioning processing units. This information can be taken into account by the single processing units in order to exclude malfunctioning processing units from the switching procedure.

Figure 5:
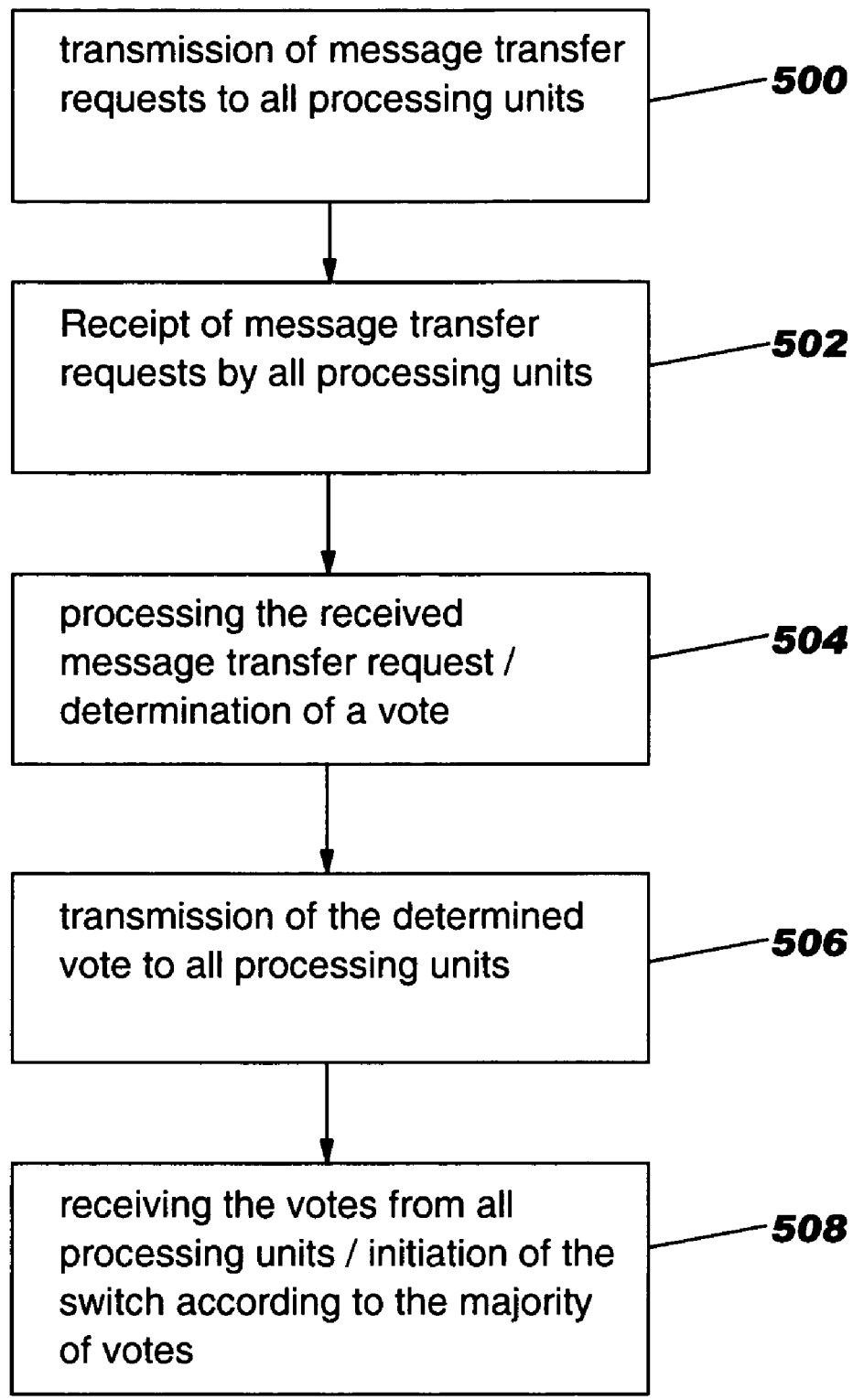
FIG. 5 illustrates a flow chart of a method according to the invention.

FIG. 5 is a flow chart that illustrates aspects of the switching method of the present invention. In step 500, one or more message transfer requests from one or more processing units are sent to all the processing units of the system. In step 502, the transmitted message transfer requests are received by all the processing units of the system. In step 504, the received message transfer requests are processed by all the processing units, and each processing unit generates a vote determining the processing unit receiving the communication grant. In step 506, the plurality of generated votes is transmitted to all the processing units of the system. In step 508, the processing units of the system receive the votes of the other processing units. Each processing unit processes the plurality of received votes and initiates a switch that corresponds to the majority of votes. In this way, a malfunctioning processing unit does not negatively influence the switching and routing procedure. Consequently, small deviations indicating malfunctioning of individual parts of the distributed switching system can effectively be compensated for.

What is claimed is:

1. A computer program product for a distributed switching system for a commutation network comprising a plurality of processing units, each of the plurality of processing units being connected to each other of the plurality of processing units, the computer program product for issuing a communication grant to a first processing unit, comprising computer program means for:

(a) processing a plurality of message transfer requests of a plurality of processing units; and (b) calculating a communication grant to the first processing unit being selective with respect to one of the following: a message transfer request, a message destination, a message quality specification, a message priority specification, a message urgency specification, a processing unit allocation status, and a vote statement;

wherein calculating the communication grant further comprises: receiving a plurality of communication grants as votes; comparing all received communication grants; and calculating a communication grant to be issued to a single one of the plurality of processing units according to a majority of votes.

2. A method for a distributed switching system for a communication network comprising a plurality of processing units, each of the plurality of processing units being connected to each other of the plurality of processing units, the method for issuing a communication grant to a first processing unit, said method comprising:

processing a plurality of message transfer requests of a plurality of processing units; and calculating, a communication grant to the processing unit being selective with respect to one of the following: a message transfer request, a message destination, a message quality specification, a message priority specification, a message urgency specification, a processing unit allocation status, and a vote statement;

wherein calculating the communication grant further comprises: receiving a plurality of communication grants as votes; comparing all received communication grants; and calculating a communication grant to he issued to a single one of the plurality of processing units according to a majority of votes.

3. Apparatus for a distributed switching system for a communication network comprising a plurality of processing units, each of the plurality of processing units being connected to each other of the plurality of processing units, the apparatus for issuing a communication grant to a first processing unit, said apparatus comprising:

means for processing a plurality of message transfer requests of a plurality of processing units; and means for calculating a communication grant to the first processing unit being selective with respect to one of the following: a message transfer request, a message destination, a message quality specification, a message priority specification, a message urgency specification, a processing unit allocation status, and a vote statement; said means for calculating comprising means for receiving a plurality of communication grants as votes; means for comparing all received communication grants; and means for calculating a communication grant to be issued to a single one of the plurality of processing units according to a majority of votes.

* * * * *